(12) United States Patent
Lisso et al.

(10) Patent No.: US 11,107,174 B2
(45) Date of Patent: Aug. 31, 2021

(54) AUTONOMOUS PICKING FROM MIXED PALLETS

(71) Applicant: Target Brands, Inc., Minneapolis, MN (US)

(72) Inventors: Gregory Lisso, Minneapolis, MN (US); Gervasio Mutarelli, Minneapolis, MN (US)

(73) Assignee: Target Brands, Inc., Minneapolis, MN (US)

( * ) Notice: Subject to any disclaimer, the term of this patent is extended or adjusted under 35 U.S.C. 154(b) by 254 days.

(21) Appl. No.: 16/439,069

(22) Filed: Jun. 12, 2019

(65) Prior Publication Data

US 2020/0394743 A1 Dec. 17, 2020

(51) Int. Cl.
| | | |
|---|---|---|
| *G06F 7/00* | (2006.01) | |
| *G06Q 50/28* | (2012.01) | |
| *B65G 1/137* | (2006.01) | |
| *B25J 9/16* | (2006.01) | |
| *G06K 7/10* | (2006.01) | |
| *G06K 7/14* | (2006.01) | |

(52) U.S. Cl.
CPC .......... *G06Q 50/28* (2013.01); *B65G 1/1373* (2013.01); *B25J 9/1679* (2013.01); *G06K 7/10297* (2013.01); *G06K 7/1413* (2013.01)

(58) Field of Classification Search
CPC ...... G06Q 50/28; B65G 1/1373; B65G 61/00; B65G 1/1375; B25J 9/1679; G06K 7/10297; G06K 7/1413; G05B 2219/45056; B66F 9/19

USPC ................................. 700/213–216, 223, 228
See application file for complete search history.

(56) References Cited

U.S. PATENT DOCUMENTS

| | | | | |
|---|---|---|---|---|
| 5,513,944 | A | * | 5/1996 | Cullen .................... B66F 9/185 414/607 |
| 10,040,194 | B1 | | 8/2018 | Theobald |
| 10,217,074 | B1 | * | 2/2019 | Stallman ................ G06Q 10/08 |
| 2015/0032252 | A1 | * | 1/2015 | Galluzzo ............... B60P 1/5423 700/218 |
| 2015/0073589 | A1 | | 3/2015 | Khodl et al. |
| 2018/0141755 | A1 | * | 5/2018 | Khodl .................. B65G 1/1378 |

OTHER PUBLICATIONS

FraunhoferIPA [Online], "Order Picking Robot for Retail Stores and Warehouses," Uploaded to Youtube on Dec. 5, 2017, retrieved on Jun. 12, 2019, https://www.youtube.com/watch?v=ABaM5szeVFE, 3 pages (Video Submission).

(Continued)

*Primary Examiner* — Yolanda R Cumbess
(74) *Attorney, Agent, or Firm* — Fish & Richardson P.C.

(57) ABSTRACT

Robotic systems can autonomously pick a particular desired item from a mixed inventory storage location that includes multiple differing types of items. The autonomous robotic system can thereby facilitate order fulfillment and inventory management processes in an efficient manner. In particular, the systems and methods described herein can greatly reduce the amount of time required for a human worker to pick orders. The systems described take over many of the tasks related to picking items. Accordingly, the efficiency of order picking processes, as measured by the number of line items picked per human labor hour for example, is greatly enhanced.

13 Claims, 10 Drawing Sheets

(56) References Cited

OTHER PUBLICATIONS

Fanuc America Corporation [Online], "Robotic Shelf Picking—IAM Robotics Automated Storage & Retrieval System (AS/RS)," Uploaded to Youtube on Aug. 6, 2015, retrieved on Jun. 12, 2019, https://www.youtube.com/watch?v=h9eRDyZJzSA, 3 pages (Video Submission).

\* cited by examiner

AUTONOMOUS PICKING FROM MIXED PALLETS

This document relates to systems and methods for enhancing the efficiencies of order fulfillment and inventory management processes. For example, this document relates to robotic systems that can autonomously locate and pick a particular desired item from a "mixed" inventory storage location that includes multiple differing types of items. The autonomous robotic system can thereby facilitate order fulfillment and inventory management processes in an efficient manner.

BACKGROUND

The ability to efficiently and accurately process customer orders has become an essential part of doing business. In general, order picking is one of the most labor intensive and expensive operations in many warehouse operations. Productivity gains from employing automation are greatly desirable.

In many order-picking processes, items are homogenously stored in fixed locations on static shelving or pallet racks. In some cases, a human order picker operates a forklift to pick items for an order, one at a time, following a route up and down each aisle of a warehouse until the all the items on the entire order are picked. The order picker will usually use some type of picking cart into which the items are placed. Various attempts have been made to use robots to automate such order picking processes of homogenously-stored items.

In some warehouse settings, multiple types of items are stored in a single inventory storage location (e.g., pallet rack space, shelf, bin, pallet, floor location, container, etc.). Such a manner of storage can be referred to as "mixed" storage (because two or more differing types of items are mixed together in a single storage location). Automating the order picking processes from such mixed storage locations is particularly challenging.

SUMMARY

This document describes systems and methods for enhancing the efficiencies of order fulfillment and inventory management processes. For example, this document describes robotic systems that can autonomously locate and pick a particular desired item from a mixed storage location that includes multiple differing types of items. The autonomous robotic system can thereby facilitate order fulfillment and inventory management processes in an efficient manner.

In one aspect, this disclosure is directed to an order picking system that includes a mobile articulating robot with an end effector for releasably coupling with items stored in inventory of a warehouse; an item type identification system configured to identify the items stored in inventory; and mobile temporary storage accessible by the mobile articulating robot such that the mobile articulating robot can place multiple individual items of the items stored in inventory into the mobile temporary storage and retrieve the individual items from the mobile temporary storage. The mobile articulating robot is configured to: (i) receive an instruction to pick a particular item from an inventory storage location in which two or more differing types of items are stored, (ii) in response to receiving the instruction, releasably couple with a first item from the inventory storage location using the end effector, (iii) identify an item type of the first item, (iv) determine whether the first item is the particular item; and (v) place the first item into the mobile temporary storage in response to determining that the first item is not the particular item.

Such an order picking system may optionally include one or more of the following features. The system may also include a vehicle that transports the mobile articulating robot, the item type identification system, and the mobile temporary storage within the warehouse. In some embodiments, the vehicle is a human-operated fork truck. In some embodiments, the vehicle is a mobile robot or an automated guided vehicle. The item type identification system may include a barcode laser scanner. The item type identification system may include a RFID tag reader. The item type identification system may include a vision system. In some embodiments, the mobile articulating robot is also configured to place the first item to a designated location in response to determining that the first item is the particular item. In particular embodiments, the mobile articulating robot is also configured to, after placing the first item in the designated location, move items from the mobile temporary storage back into the inventory storage location.

In another aspect, this disclosure is directed to a method of order picking. The method includes: (i) receiving, by a mobile articulating robot, an instruction to pick a particular item from an inventory storage location in which two or more differing types of items are stored; (ii) picking, by the mobile articulating robot, a first item from the inventory storage location; (iii) after the picking, identifying an item type of the first item; (iv) determining whether the first item is the particular item; and (v) placing, by the mobile articulating robot, the first item into mobile temporary storage in response to determining that the first item is not the particular item.

Such a method may optionally include one or more of the following features. The method may also include: (vi) picking, by the mobile articulating robot, a second item from the inventory storage location; (vii) after the picking, identifying an item type of the second item; (viii) determining whether the second item is the particular item; and (ix) placing, by the mobile articulating robot, the second item into mobile temporary storage in response to determining that the second item is not the particular item. The method may also include: (x) picking, by the mobile articulating robot, a third item from the inventory storage location; (xi) after the picking, identifying an item type of the third item; (xii) determining whether the third item is the particular item; and (xiii) placing, by the mobile articulating robot, the third item to a designated location in response to determining that the third item is the particular item. The method may also include moving, by the mobile articulating robot, the first item and the second item from the mobile temporary storage back into the inventory storage location. In some embodiments, a laser barcode scanner is used for identifying the item type. In some embodiments, the mobile articulating robot and the mobile temporary storage are transported together by a vehicle. I certain embodiments, the vehicle is a human-operated fork truck. In particular embodiments, vehicle is a mobile robot or an automated guided vehicle. The first item may be placed into mobile temporary storage using a vision system. The instruction may be sent by an order management system. The mobile articulating robot may select a particular end effector from two or more differing end effectors based on the instruction.

The systems and processes described here may be used to provide one or more of the following optional benefits. First, labor costs associated with order fulfillment processes overall may be reduced using the automated systems and processes described herein. For example, the systems and processes described herein can function largely autonomously or semi-autonomously, thereby reducing the need for human involvement in the process of picking items from inventory, and/or for performing other inventory management processes such as physically counting inventory, and sorting and re-stowing to consolidate inventory storage. The lessened human involvement advantageously translates to lower operating costs. Second, the use of automation systems such as the autonomic robotic systems described herein can accelerate the speed of order fulfillment processes. Such reductions in cycle time for order fulfillment in some cases can facilitate quicker delivery of ordered items to customers, stores, and the like. Accordingly, customer satisfaction can be increased, and inventory-carrying costs can be decreased. Third, order fulfillment quality can be improved through automation by reducing the potential for human errors. Humans are statistically prone to a higher level of error than automation processes. Fourth, in some cases the density or number of order pickers per aisle can be increased. Most operations limit the number of order pickers to aisles because it is difficult or impossible in many cases for trucks to pass each other. Mobile robots with cargo, however, are smaller and more precise in maneuvering, and could therefore pass other mobile robot pickers. This would allow for the operation of multiple order pickers per aisle, further improving cycle time. Fifth, cubic utilization of storage systems can be improved in most instances. Because pure SKU storage would no longer provide a labor benefit, mixed SKU storage systems can be increased, providing better usage/utilization of storage systems. For example, pure SKU pallets are picked until they are depleted, lowering the utilization of the space until it is zero. This invention facilitates keeping mixed SKU storage fully utilized to maximize space usage. Items can be stowed/put-away in any storage location while continuing to pick from that same locations, regardless of SKU/content. Sixth, automation of the operations as described herein can allow for reduction in facility costs, e.g., reduced lighting, HVAC, restrooms, breakrooms, and other support facilities.

Other features, aspects and potential advantages will be apparent from the accompanying description and figures.

DESCRIPTION OF DRAWINGS

Like reference symbols in the various drawings indicate like elements

DETAILED DESCRIPTION

This document describes systems and methods for enhancing the efficiencies of order fulfillment and inventory management processes. For example, this document describes robotic systems that can autonomously locate and pick a particular desired item from a mixed storage location that includes multiple differing types of items. The autonomous robotic system can thereby facilitate order fulfillment and inventory management processes in an efficient manner. In particular, the systems and methods described herein can greatly reduce the amount of time required for a human worker to pick orders. As described further below, robots take over many of the tasks related to picking items. Accordingly, the efficiency of order picking processes, as measured by the number of line items picked per human labor hour for example, is greatly enhanced.

Figure 1:
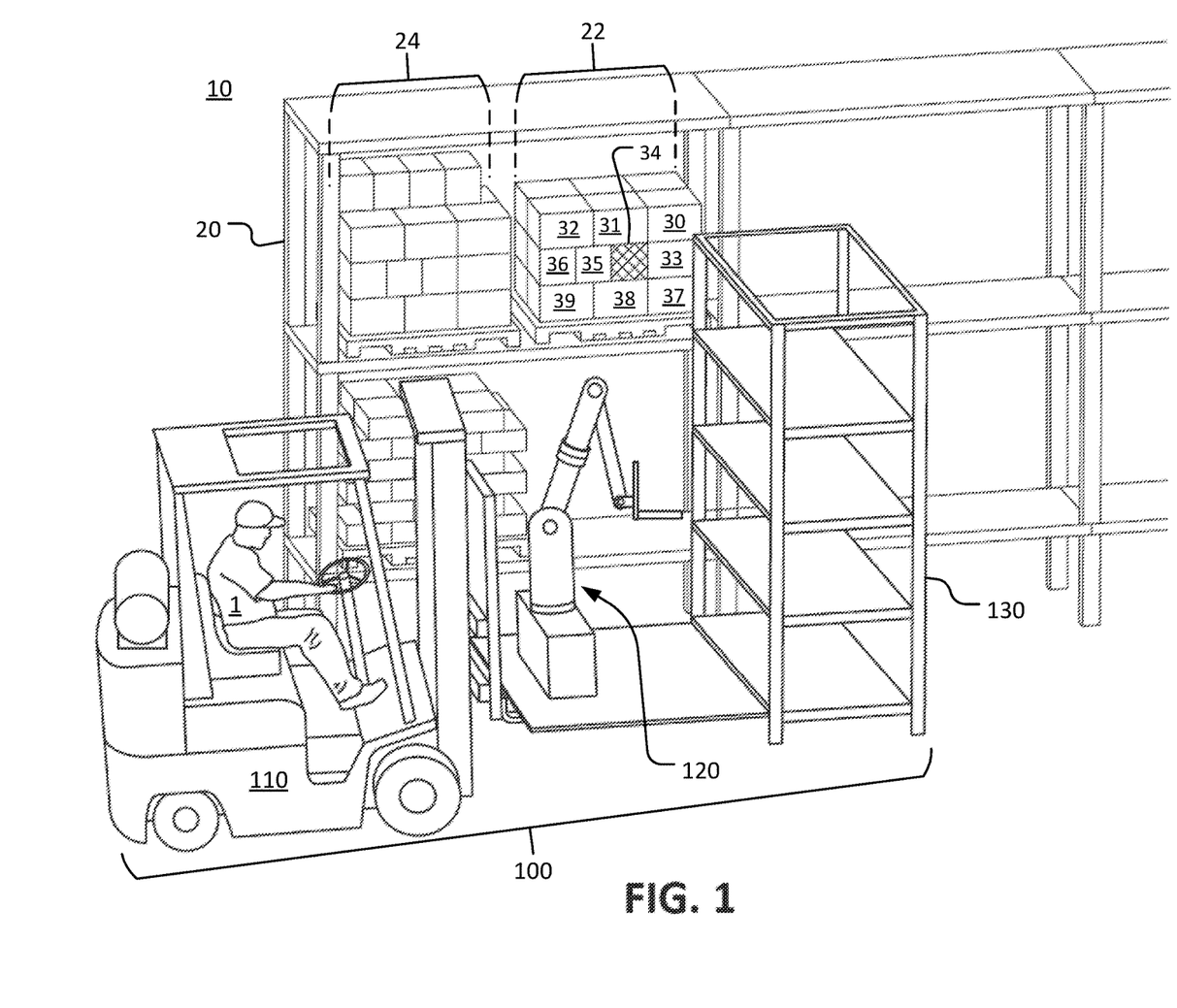
FIG. 1 illustrates an example order picking scenario in a warehouse setting. A desired item container to be picked for an order is located in mixed item storage location. An example semi-autonomous order picking system is approaching the mixed item storage location in preparation for picking the desired item container.

Referring to FIG. 1, an example semi-autonomous order picking system 100 is working in a warehouse 10. The warehouse 10 is representative of a variety of different types of facilities such as, but not limited to, flow centers, distribution centers, inventory storing locations, order fulfillment centers, receive centers, stores, cross-docking facilities, material handling facilities, and the like, and combinations thereof. In this disclosure, the term "warehouse" may be used to refer to any and all such different types of facilities, and combinations thereof.

In the depicted example scenario, the semi-autonomous order picking system 100 is performing an order picking process. That is, the semi-autonomous order picking system 100 is traveling through the warehouse 10 and obtaining (or "picking") one or more desired items to fulfill an order for the one or more desired items. Such an order can be in response to a demand for the one or more desired items from variety of different entities such as, but not limited to, individual consumers, retail stores (e.g., for stock replenishment), business partners, other warehouse facilities, and the like.

The order for the one or more desired items may be for one unit of a single item, for multiple units of a single item, for two or more different types of items, for a case quantity, for a pallet load, and the like, and any and all possible permutations thereof. Whatever the order includes, the goal of the order fulfillment process is to ship (preferably in a single shipment) all of the items included in the order in a timely and accurate manner. However, the scope of the order fulfillment process also includes partial shipments that do not include all of the items included in an order.

In the depicted example, items are stored on racking 20. The racking 20 defines multiple inventory storage locations. For example, the racking 20 defines a first storage location 22 and a second storage location 24, among others. The storage locations defined by the racking 20 are representative of various other types of item storage locations such as, but not limited to, shelves, bins, pallets, floor locations, containers, and the like, and combinations thereof.

There can be multiple items stored at each of the storage locations. For example, as depicted, there are multiple items stored at the first storage location 22. In particular, there are multiple boxes (e.g., boxes 30-39 are labeled) stored at the first storage location 22.

While the depicted example illustrates boxes as the items being picked for an order, the boxes are representative of all other various types of items such as, but not limited to, totes, cases, singles, unboxed items, bins, and the like, and combinations thereof.

All of the boxes stored at the first storage location 22 share a common address in the inventory management system of the warehouse 10. That is, the inventory management system identifies all of the boxes stored at the first storage location 22 as having the same address location (i.e., the first storage location 22).

The items stored at the first storage location 22 are mixed items. In other words, two or more different types of items are stored at the first storage location 22. Accordingly, it can be said that the first storage location 22 is a mixed inventory storage location 22. For that reason, the process of picking items for an order from the first storage location 22 cannot be as simple as just picking any box randomly (e.g., a readily available box from the top of the stack of boxes). Instead, the type of item(s) must be identified, and the particular desired type of item for the order must be picked (while the other types of items at the mixed inventory storage location 22 are not picked from the mixed inventory storage location 22).

For the purpose of describing how the semi-autonomous order picking system 100 operates, the example illustrated herein (by the series of FIGS. 1-9) assumes that the box 34 (or item 34) is an item that needs to be picked for the order that the semi-autonomous order picking system 100 is picking. Conversely, the other items at the mixed inventory storage location 22 are not on the order that the semi-autonomous order picking system 100 is picking. Box 34 is shown as cross-hatched in the figures so that it is readily visually distinguishable from the other boxes.

Still referring to FIG. 1, it can be seen that the desired item 34 is not on the top of the stack of items stored at the mixed inventory storage location 22. Accordingly, a number of boxes will need to be sifted or sorted through prior to being physically able to pick the desired box 34. As described further below, the semi-autonomous order picking system 100 is configured and operable to autonomously perform such a procedure.

The semi-autonomous order picking system 100 includes a vehicle 110, an articulating robot 120, and temporary storage 130. The vehicle 110 transports the articulating robot 120 and temporary storage 130 within the warehouse 10 during the order picking process.

In the depicted example, a human-operated fork truck is depicted as the vehicle 110. The human-operated fork truck 110 is operated by a human 1. Accordingly, the example semi-autonomous order picking system 100 is called "semi-autonomous" because it includes a human-operated fork truck as the vehicle 110. Alternatively, in some embodiments the vehicle 110 is a mobile robot, an automated guided vehicle ("AGV"), or another type of autonomous vehicle that does not require a human operator. In such cases, the order picking system 100 can be fully autonomous (without a human directly involved in operating the order picking system 100), rather than semi-autonomous.

In some embodiments, the semi-autonomous order picking system 100 operates semi-autonomously in the following manner. The human 1 drives the semi-autonomous order picking system 100 to the proper inventory storage location to pick a desired item (e.g., as indicated on an order pick list either electronically or on paper). Next, if necessary, the human 1 raises or lowers the forks of the semi-autonomous order picking system 100 to position the articulating robot 120 adjacent to the inventory storage location in which the desired item is located. Then, the human operator activates the articulating robot 120 to start autonomously sorting through the items at the inventory storage location to find the desired item for the order being picked (as described further below).

When the desired item for the order has been picked, the human 1 can then drive the semi-autonomous order picking system 100 (and the desired item that was picked) to a next proper inventory storage location to pick a next desired item (if the order includes one or more additional desired items). This process is illustrated in the following series of figures.

Figure 2:
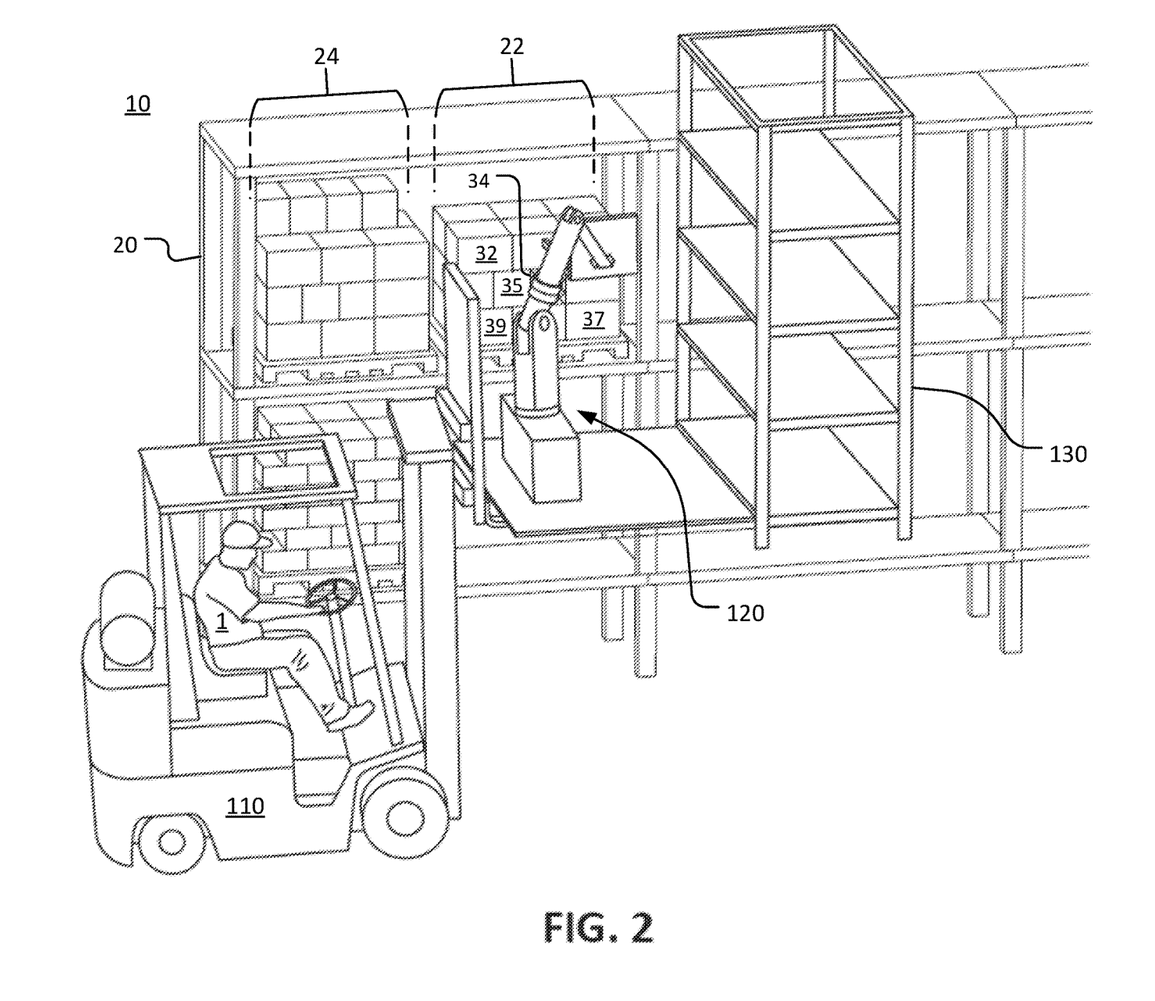
FIG. 2 illustrates the semi-autonomous order picking system in position to pick a first item container from the mixed item storage location. The first item container is not the desired item container.

Referring to FIG. 2, here the semi-autonomous order picking system 100 is being operated by the human 1 to position the articulating robot 120 adjacent to the mixed inventory storage location 22 in which the desired item 34 is located. In particular, the human 1 parked the fork truck 110 in the proper position and raised the articulating robot 120 to be adjacent to the mixed inventory storage location 22.

With the articulating robot 120 properly positioned, the human 1 can then activate the articulating robot 120 to begin removing boxes from the mixed inventory storage location 22 in search of the desired box 34. Once activated, the articulating robot 120 performs autonomously. The articulating robot 120 can be in communication with the warehouse management system so that the articulating robot 120 receives information corresponding to the desired item 34, so that the articulating robot 120 knows what to pick from the mixed inventory storage location 22 without further human intervention.

Figure 3:
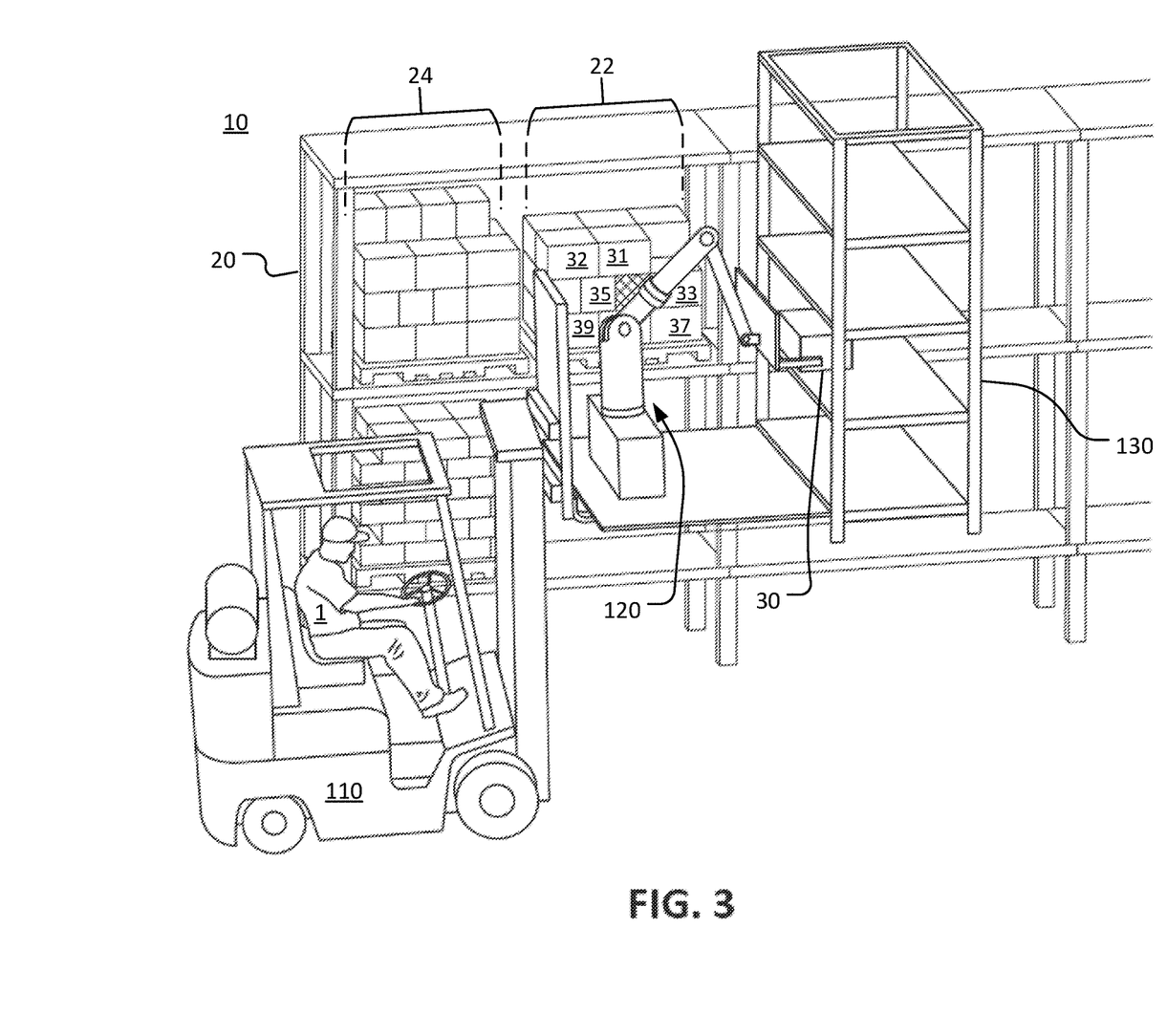
FIG. 3 illustrates the semi-autonomous order picking system transferring the first item container from the mixed item storage location to a temporary storage position.

Referring to FIG. 3, here the semi-autonomous order picking system 100 is beginning to autonomously search within the mixed inventory storage location 22 for the desired box 34 to be picked for the order. For example, the articulating robot 120 has picked up a first box 30 from the stack of boxes in the mixed inventory storage location 22.

After picking up the first box 30, or prior to picking up the first box 30, the articulating robot 120 detects the type of item that the first box 30 is. This detection can be performed by the articulating robot 120 in various ways such as, but not limited to, by scanning a barcode on the box 30 (or scanning a barcode label on the box 30), by sensing an RFID tag ("radio-frequency identification" tag) on the box 30, by recognizing text on the box 30 (e.g., using optical character recognition), and the like, and/or using combinations of such methods.

If the first box 30 is identified by the articulating robot 120 as the desired box to be picked for the order, then the process is essentially complete and the semi-autonomous order picking system 100 can move on to the next inventory storage location to be picked from. However, if the first box 30 is not identified as the desired box to be picked for the order (which is the case in this example since the desired box is box 34), then the articulating robot 120 places the first box 30 in temporary storage 130 (e.g., the depicted shelf or other suitable storage system/mode).

Figure 4:
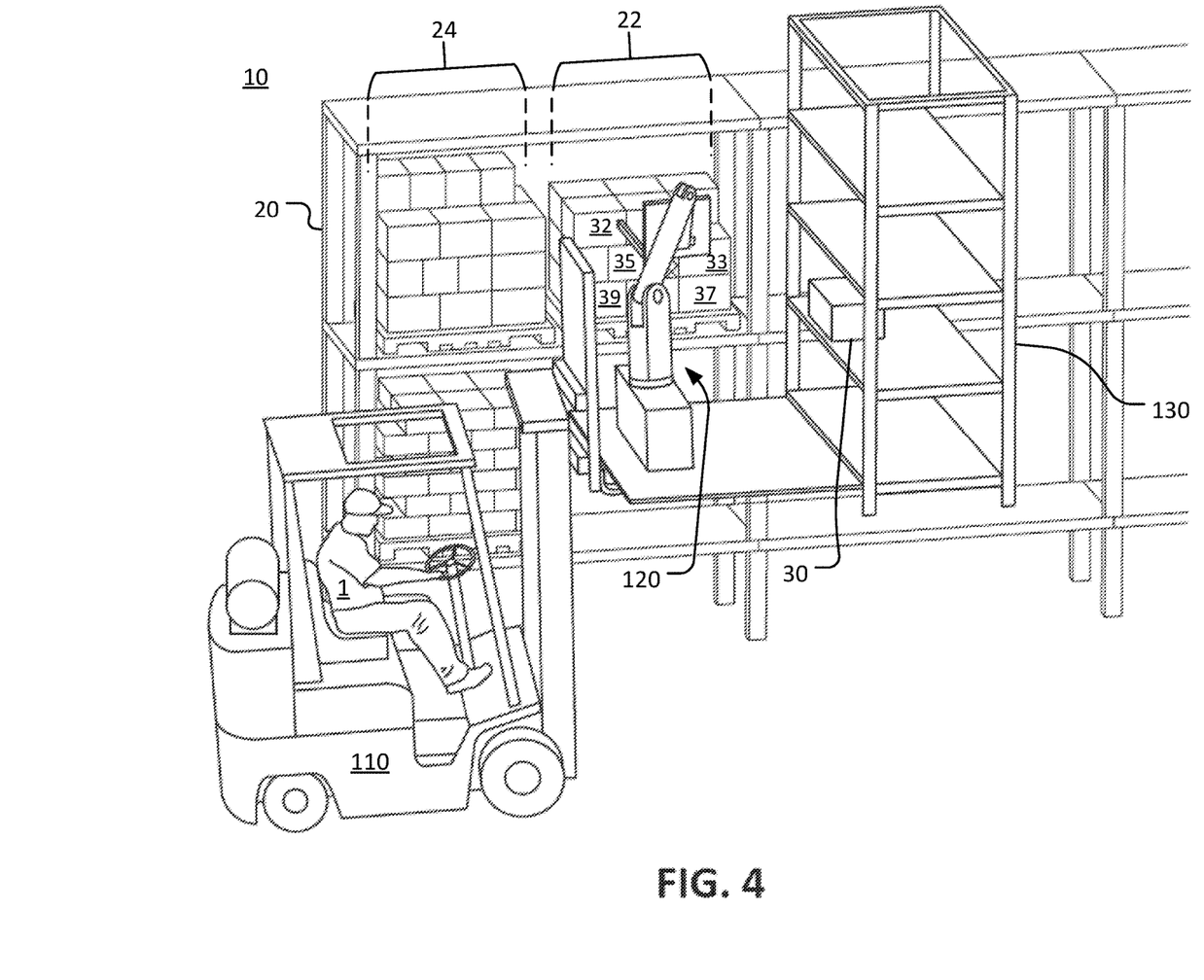
FIG. 4 illustrates the semi-autonomous order picking system in position to pick a second item container from the mixed item storage location. The second item container is also not the desired item container.

Referring to FIG. 4, while the first box 30 is residing in temporary storage 130, the articulating robot 120 then proceeds to pick up another box from among the boxes stored in the mixed inventory storage location 22. In other words, the articulating robot 120 continues its autonomous search for the desired box 34.

Figure 5:
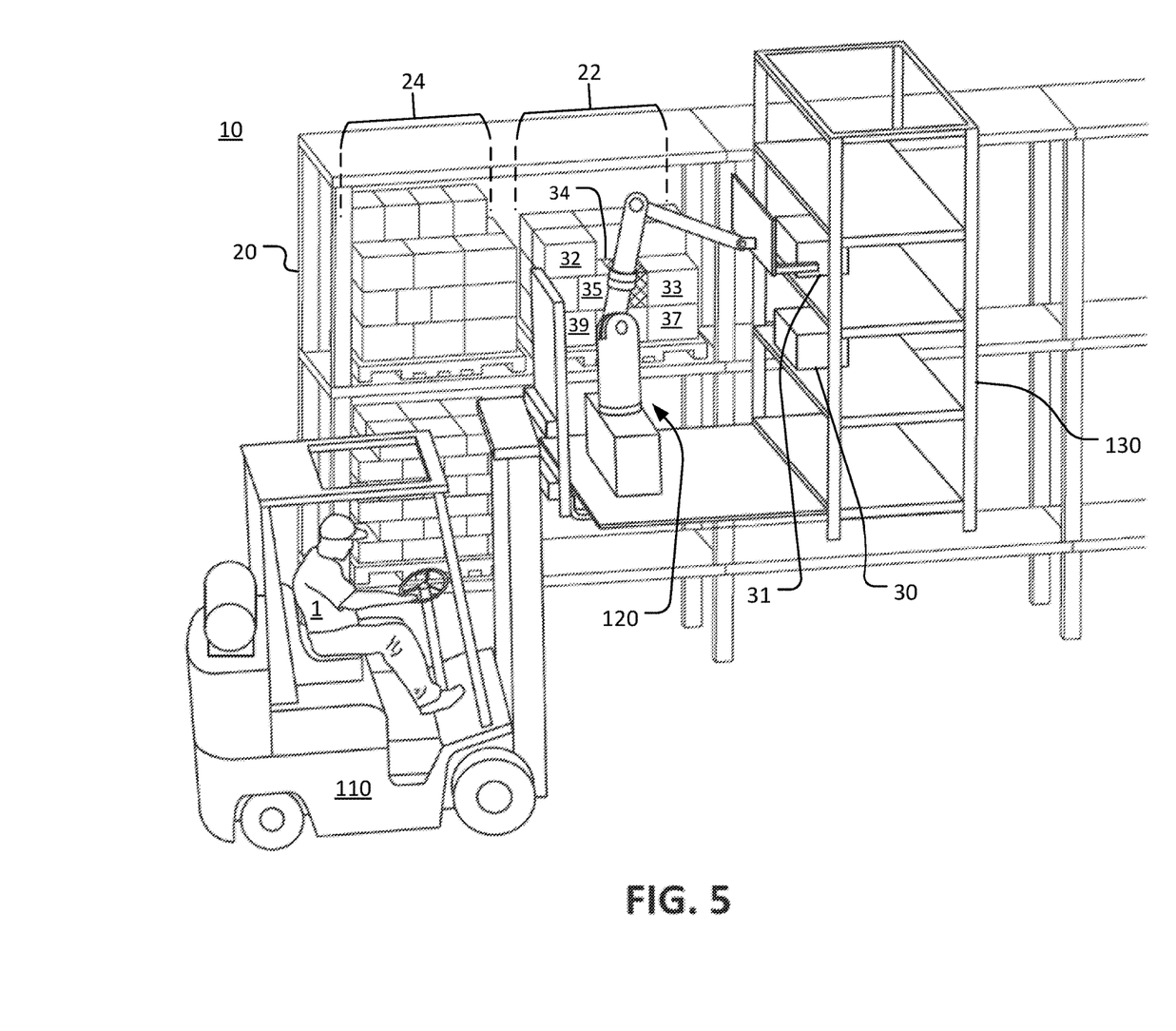
FIG. 5 illustrates the semi-autonomous order picking system transferring the second item container from the mixed item storage location to a temporary storage position.

Referring to FIG. 5, here the articulating robot 120 has continued its search for the desired box 34 by picking up a second box 31 from within the inventory storage location 22. As it did with the first box 30, the articulating robot 120 identifies the second box 31 to determine whether it is the desired box to be picked for the order. Since the second box 31 is, once again, not the desired box to be picked for the order, the articulating robot 120 places the second box 31 in temporary storage 130.

Figure 6:
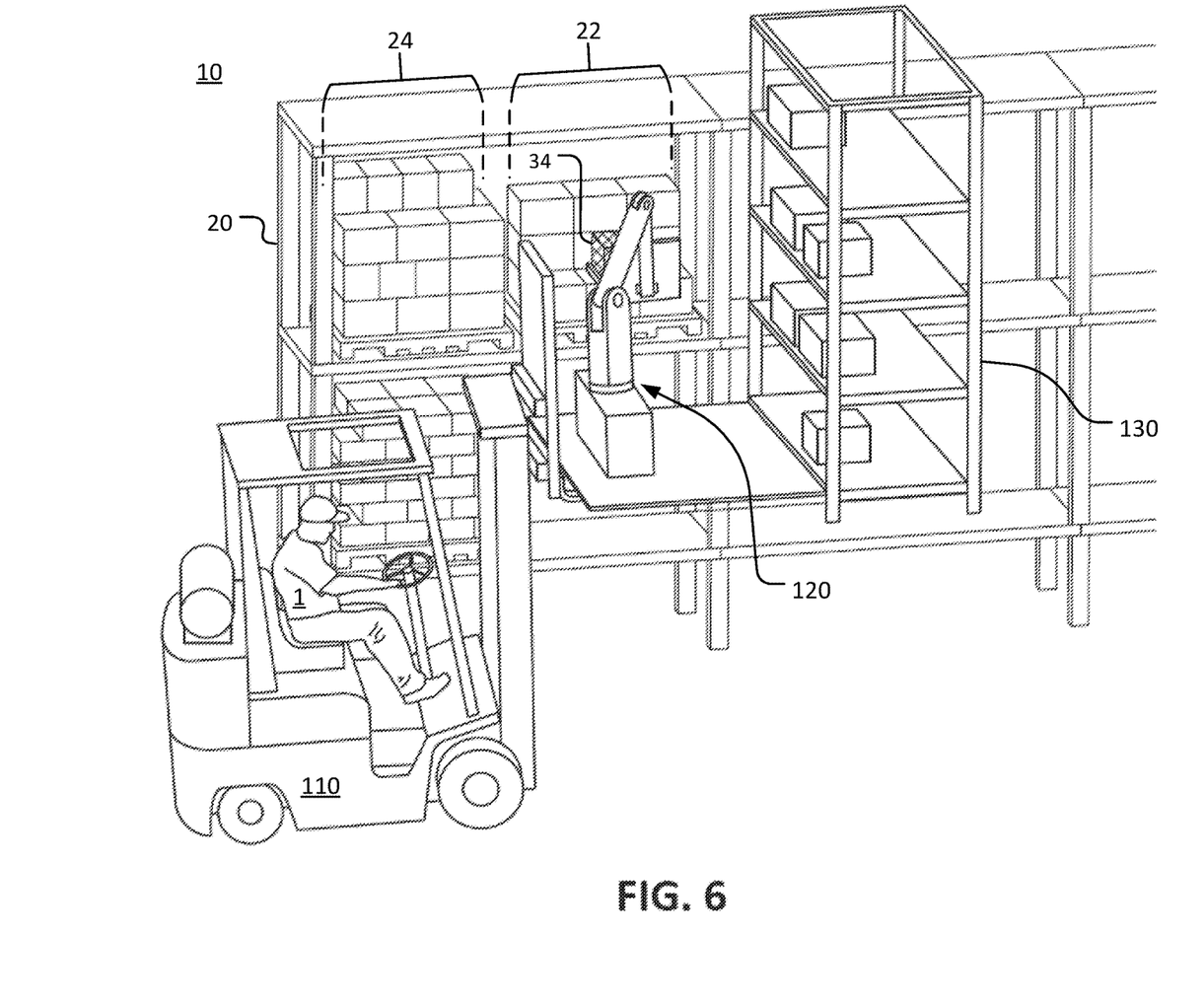
FIG. 6 illustrates the semi-autonomous order picking system in position to pick the desired item container from the mixed item storage location.

Referring to FIG. 6, here the articulating robot 120 has continued its search for the desired box 34 by picking up, one by one, additional boxes from within the mixed inventory storage location 22. In each case, the articulating robot 120 detects the type of item that each box is and determines whether the box is the desired box to be picked for the order. If the articulating robot 120 determines that the box not the desired box, then the articulating robot 120 places the box in temporary storage 130. Accordingly, as shown, multiple boxes can be located in temporary storage 130 as the articulating robot 120 searches for the desired box 34 from among the numerous boxes stored in the mixed inventory storage location 22.

Figure 7:
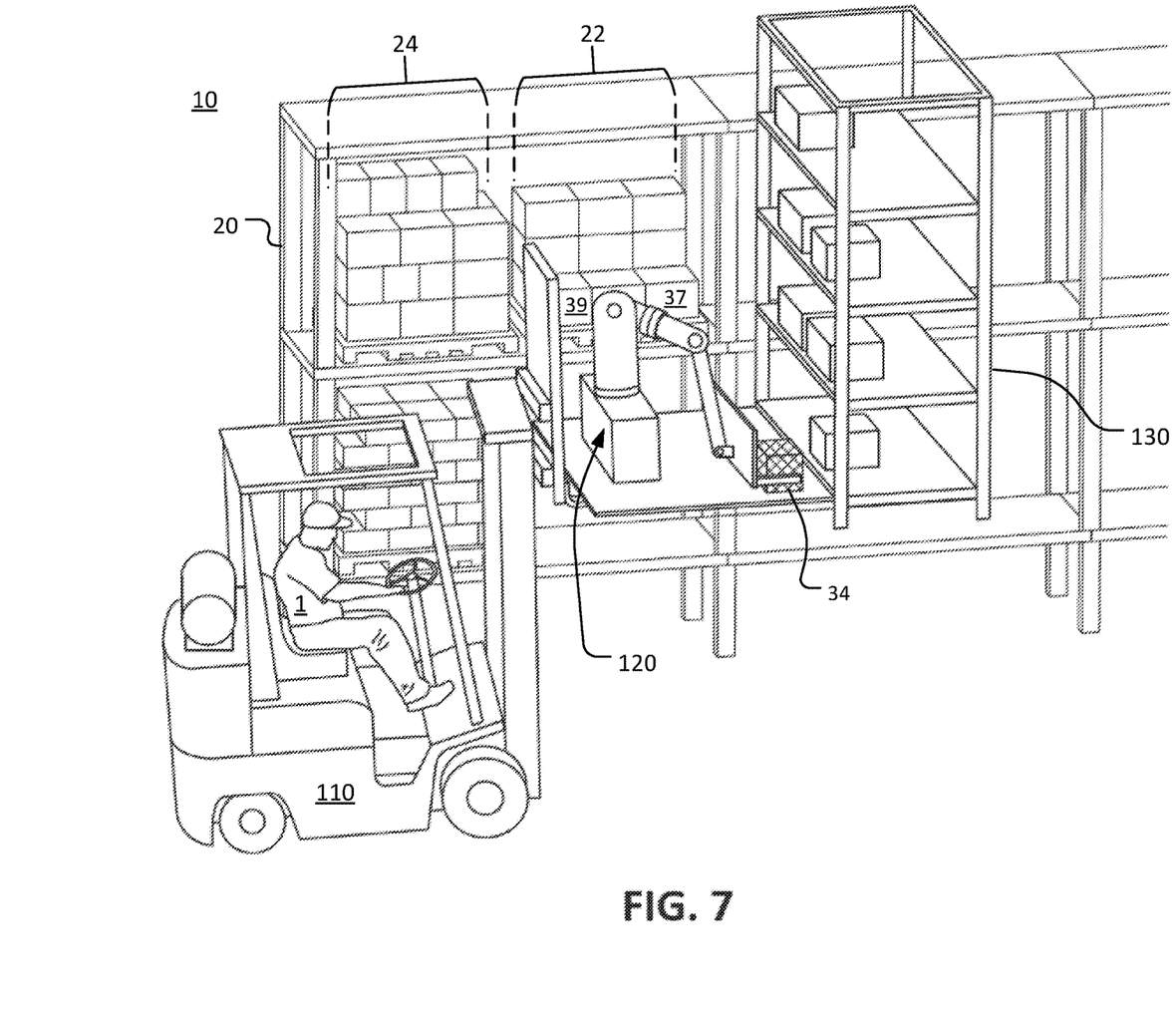
FIG. 7 illustrates the semi-autonomous order picking system placing the desired item container in a location that is designated for storing desired item containers.

Referring to FIG. 7, finally the articulating robot 120 has picked a box from the mixed inventory storage location 22 and identified the box as being the desired box 34. The articulating robot 120 then places the desired box 34 in a designated area for the boxes to be picked for the customer order (e.g., in this case the articulating robot 120 is placing the desired box 34 on the platform to which the articulating robot 120 is mounted). In some embodiments, the articulating robot 120 may place the desired box 34 into an order picking cage, basket, container, bin, tote, cart, shelf, and/or the like. In particular embodiments, the articulating robot 120 may place the desired box 34 onto a mobile robot that is staged near to the semi-autonomous order picking system 100.

Figure 8:
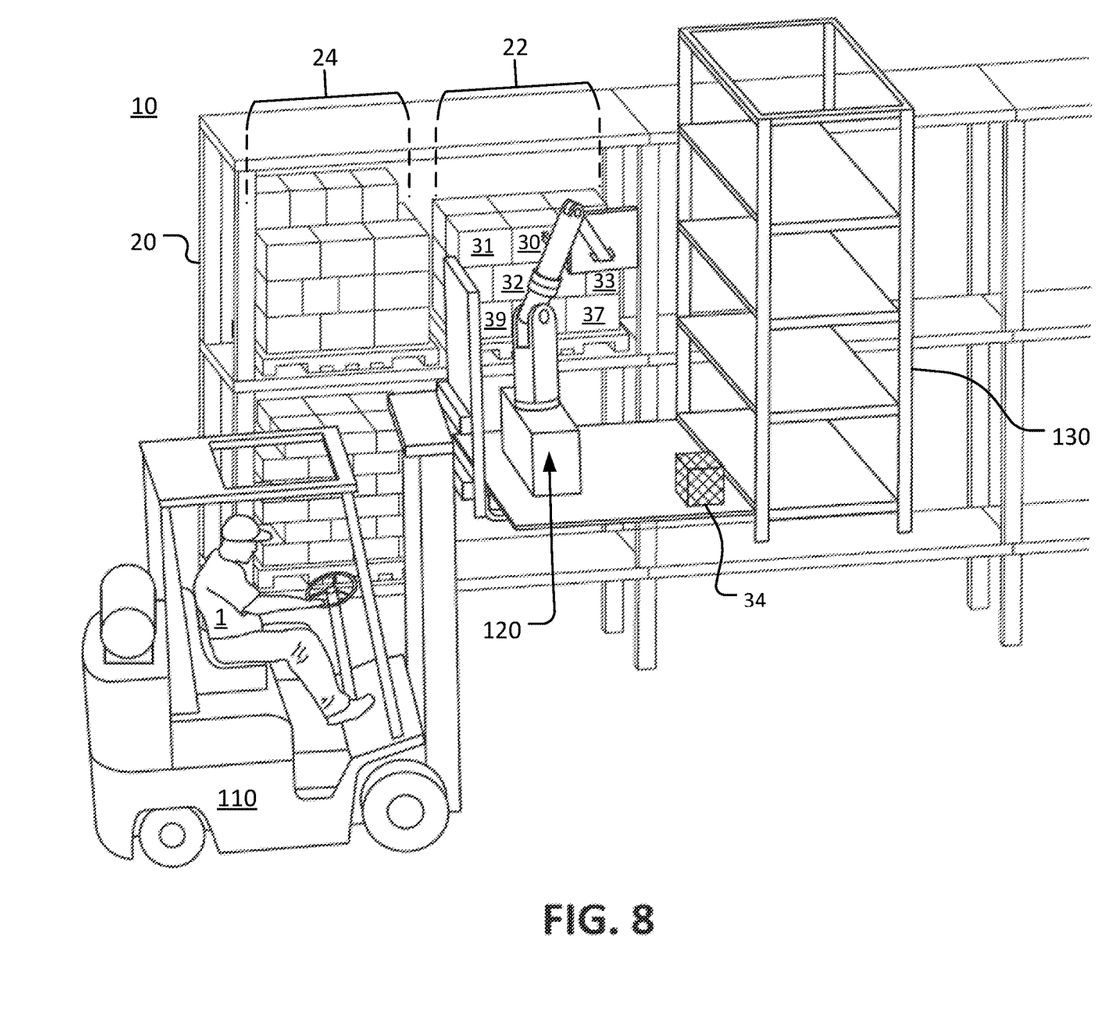
FIG. 8 illustrates the semi-autonomous order picking system replacing the item containers from the temporary storage positions back to the mixed item storage location.

Referring to FIG. 8, since the desired box 34 has been found and positioned in the designated area for the boxes to be picked for the order, the articulating robot 120 can then replace the other boxes from the temporary storage 130 back into the mixed inventory storage location 22.

Figure 9:
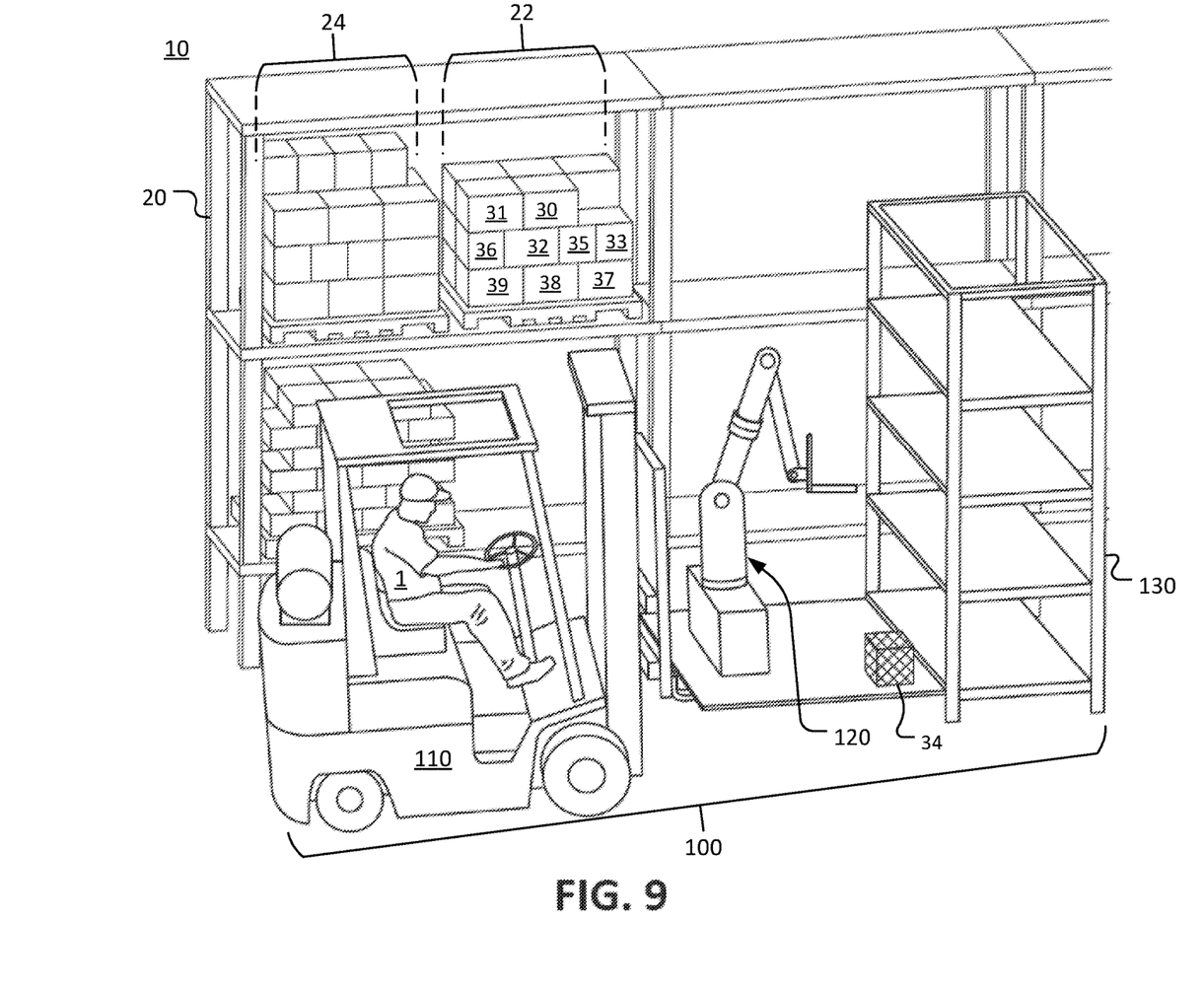
FIG. 9 illustrates the semi-autonomous order picking system traveling away from the mixed item storage location on its way to pick another item(s) for the order.

Referring to FIG. 9, after replacing the other boxes from the temporary storage 130 back into the mixed inventory storage location 22, and with the desired box 34 on board, the semi-autonomous order picking system 100 can then proceed to a next inventory storage location to pick one or more additional desired items to fulfill the order as needed. The next inventory storage location(s) can be either a mixed inventory storage location or a homogenous inventory storage location, and any combinations thereof.

Figure 10:
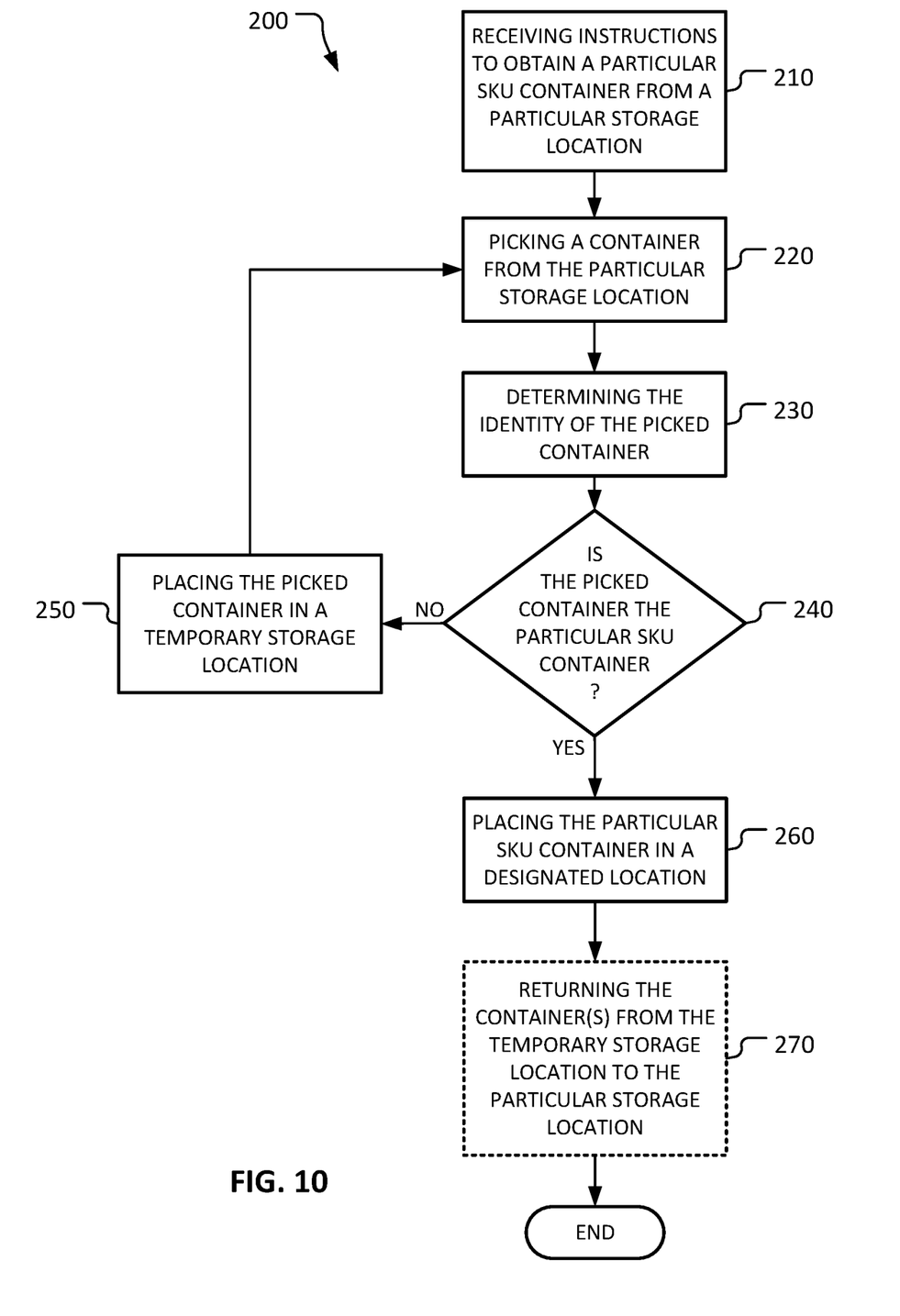
FIG. 10 is a flowchart of an example process for autonomously picking a desired item from a mixed storage location.

Referring to FIG. 10, the illustrated flowchart describes an example process 200 for autonomously picking a desired item from a mixed storage location. The process 200 can be performed by a system such as the semi-autonomous order picking system 100 described above (and by other autonomous or semi-autonomous order picking systems described herein).

The process 200 begins at step 210 with the order picking system receiving instructions to obtain a particular SKU (item) container from a particular storage location. In some embodiments, such instructions can be sent by one or more computerized systems, such as an order management system. For example, in some embodiments the order picking system can be in wireless communication with the order management system such that the order management system can send information or control commands to the order picking system that result in movements by the order picking system when and where as necessary to execute the steps pertaining to process 200 as described herein.

At step 220, the autonomous or semi-autonomous order picking system picks a container from the particular storage location. This step is illustrated, for example, in FIG. 2 described above.

At step 230, the autonomous or semi-autonomous order picking system determines the identity of the picked container. This can be accomplished by the autonomous or semi-autonomous order picking system using a barcode laser scanner, RFID reader, vision system, and other suitable systems.

At step 240, the autonomous or semi-autonomous order picking system determines whether the picked container is the particular SKU container that is intended to be picked in accordance with the instructions received in step 210. If the picked container is not the particular SKU container that is intended to be picked, then, in accordance with step 250 the autonomous or semi-autonomous order picking system places the picked container in a temporary storage location. After that, the process 200 reverts back to step 220 and another container is picked from the particular storage location.

If the picked container is the particular SKU container that is intended to be picked, then the next step of the process 200 is step 260. At step 260, the autonomous or semi-autonomous order picking system places the particular SKU container in a designated location. This is described above in reference to FIG. 7, for example.

At optional step 270, containers that were placed in temporary storage can be returned to the particular storage location. This is described above in reference to FIG. 8, for example.

Additional Optional Features and Embodiments

In some embodiments, the autonomous or semi-autonomous order picking systems described herein also include a vision system and/or other types of sensors. Such a vision system can be used for various purposes such as to facilitate the picking up and placing down of the item or SKU containers by the articulating robot (e.g., articulating robot 120).

In some embodiments, the autonomous or semi-autonomous order picking systems described herein can have or use various types of end effectors with which to interface with item containers. The end effectors can be clamping devices, suction devices, forks, and combinations thereof, to provide a few examples.

In some embodiments, the autonomous or semi-autonomous order picking systems described herein can include the capability to autonomously change end effectors. In some such embodiments, the autonomous or semi-autonomous order picking systems described herein can include an end effector changing station on the platform of the autonomous or semi-autonomous order picking system.

While the functionality of the autonomous or semi-autonomous order picking systems described herein is described above in the context of picking a desired item from a mixed inventory storage location, it should be understood that the autonomous or semi-autonomous order picking systems can also perform other beneficial processes. For example, in some embodiments the autonomous or semi-autonomous order picking systems can autonomously or semi-autonomously sort item inventory and consolidate the inventory so as to organize and reduce inventory storage space. That is, items can be picked from a mixed inventory storage location, identified, and then re-stowed back into storage in an enhanced manner according to the desired inventory management practices of the warehouse.

Another example use for the autonomous or semi-autonomous order picking systems described herein is for quality control checks of inventory accuracy. Essentially, the autonomous or semi-autonomous order picking systems described herein can autonomously perform inventory counts or cycle counts so as to ascertain an accurate count of items that are stored in inventory.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse, a trackball, or a touchscreen, etc.) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, tactile input, eye movement tracking input, a brain-computer interface, gesture input, and the like, and combinations thereof).

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described herein as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described herein should not be understood as requiring such separation in all embodiments, and it should be understood that the described program components and systems can generally be integrated together in a single product or packaged into multiple products.

What is claimed is:

1. An order picking system, comprising:
    a vehicle;
    a mobile articulating robot with an end effector for releasably coupling with items stored in inventory of a warehouse;
    an item type identification system configured to identify the items stored in inventory;
    mobile temporary storage accessible by the mobile articulating robot such that the mobile articulating robot can place multiple individual items of the items stored in inventory into the mobile temporary storage and retrieve the individual items from the mobile temporary storage; and a designated area for items that are picked in response to instructions, wherein the vehicle transports: (a) the mobile articulating robot, (b) the item type identification system, (c) the mobile temporary storage, and (d) the designated area for items that are picked in response to instructions, around the warehouse, wherein the order picking system is configured to:
- (i) receive a first instruction to pick a particular item from a first inventory storage location in which two or more differing types of items are stored,
- (ii) in response to receiving the first instruction, travel within the warehouse, using the vehicle, to the first inventory storage location, and releasably couple with a first item from the first inventory storage location using the end effector,
- (iii) identify an item type of the first item,
- (iv) determine whether the first item is the particular item;
- (v) place the first item into the mobile temporary storage in response to determining that the first item is not the particular item,
- (vi) releasably couple with a second item from the first inventory storage location using the end effector,
- (vii) determine whether the second item is the particular item,
- (viii) in response to determining that the second item is the particular item, place the second item in the designated area for items that are picked in response to instructions,
- (ix) return, using the end effector, the first item from the mobile temporary storage to the first inventory storage location, and
- (x) in response to receiving a second instruction, travel within the warehouse, using the vehicle with the particular item on board the vehicle in the designated area for items that are picked in response to instructions, to a second inventory storage location located away from the first inventory storage location.

2. The system of claim 1, wherein the vehicle is a human-operated fork truck.

3. The system of claim 1, wherein the vehicle is a mobile robot or an automated guided vehicle.

4. The system of claim 1, wherein the item type identification system comprises a barcode laser scanner.

5. The system of claim 1, wherein the item type identification system comprises a RFID tag reader.

6. The system of claim 1, wherein the item type identification system comprises a vision system.

7. A method of order picking, the method comprising:

receiving, by a mobile articulating robot, a first instruction to pick a particular item from a first inventory storage location in which two or more differing types of items are stored;

traveling, by a vehicle transporting: (a) the mobile articulating robot, (b) an item type identification system, (c) a mobile temporary storage, and (d) a designated area for items that are picked in response to instructions, to the first inventory storage location within a warehouse;

picking, by the mobile articulating robot, a first item from the first inventory storage location;

after the picking, identifying an item type of the first item using the item type identification system;

determining whether the first item is the particular item;

placing, by the mobile articulating robot, the first item into the mobile temporary storage in response to determining that the first item is not the particular item;

picking, by the mobile articulating robot, a second item from the first inventory storage location;

determining whether the second item is the particular item;

in response to determining that the second item is the particular item, placing the second item in the designated area for items that are picked in response to instructions;

returning, by the mobile articulating robot, the first item from the mobile temporary storage to the first inventory storage location; and in response to receiving a second instruction, traveling within the warehouse, using the vehicle with the particular item on board the vehicle in the designated area for items that are picked in response to instructions, to a second inventory storage location located away from the first inventory storage location.

8. The method of claim 7, wherein the item type identification system comprises a laser barcode scanner for identifying the item type.

9. The method of claim 7, wherein the vehicle is a human-operated fork truck.

10. The method of claim 7, wherein the vehicle is a mobile robot or an automated guided vehicle.

11. The method of claim 7, wherein the first item is placed into the mobile temporary storage using a vision system.

12. The method of claim 7, wherein the instruction is sent by an order management system.

13. The method of claim 7, wherein the mobile articulating robot selects a particular end effector from two or more differing end effectors based on the instruction.

* * * * *